(12) United States Patent
Proudler et al.

(10) Patent No.: US 7,236,455 B1
(45) Date of Patent: Jun. 26, 2007

(54) COMMUNICATIONS BETWEEN MODULES OF A COMPUTING APPARATUS

(75) Inventors: Graeme John Proudler, Bristol (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/913,453

(22) PCT Filed: Feb. 15, 2000

(86) PCT No.: PCT/GB00/00504

§ 371 (c)(1),
(2), (4) Date: Aug. 14, 2001

(87) PCT Pub. No.: WO00/48062

PCT Pub. Date: Aug. 17, 2000

(30) Foreign Application Priority Data

Feb. 15, 1999 (EP) .................................. 99301100
Aug. 13, 1999 (EP) .................................. 99306416

(51) Int. Cl.
*G06F 11/00* (2006.01)
*G06F 12/14* (2006.01)
*H04L 12/28* (2006.01)
*H04K 1/00* (2006.01)

(52) U.S. Cl. ...................... 370/230; 370/396; 370/401; 380/255; 713/182; 713/189

(58) Field of Classification Search ........ 370/229–230, 370/400–410, 338; 709/208–219, 249–252, 709/200; 380/255–287; 713/150–171, 189–202, 713/182
See application file for complete search history.

(56) References Cited

U.S. PATENT DOCUMENTS 5,361,359 A    11/1994  Tajalli et al. ............... 395/700

(Continued)

FOREIGN PATENT DOCUMENTS

EP           0 510 244 A1    10/1992

(Continued)

OTHER PUBLICATIONS

Anderson, R. and Markus Kuhn, "Tamper Resistance—a Cautionary Note," 16 pages, located at Internet address <www.cl.cam.ac.uk/~mgk25/tamper.html> (1996).

(Continued)

*Primary Examiner*—Chi Pham
*Assistant Examiner*—Tri H. Phan (57) ABSTRACT

A computing apparatus comprises a plurality of hardware modules (102,104,106) and a shared communication infrastructure (110) by which the modules can communicate with each other in the usual way. In order to increase the level of trust and security in the apparatus, a trusted hardware module (120) is also provided and is connected to the other modules by respective communication paths (122a;122b; 122c), distinct from the communication infrastructure, by which each of those modules can communicate directly with the trusted module but cannot communicate directly with any other of the modules. The trusted module can therefore have secure communications, for example of "unsafe" data, with each of the other modules without any of the remaining modules eavesdropping, and the trusted module can route unsafe data between any pair of the other modules, or decline to provide such routing, for example in dependence on policy stored in the trusted module.

30 Claims, 8 Drawing Sheets

U.S. PATENT DOCUMENTS

| | | | |
|---|---|---|---|
| 5,421,006 A | 5/1995 | Jablon et al. | 395/575 |
| 5,444,850 A | 8/1995 | Chang | 395/200.1 |
| 5,530,758 A * | 6/1996 | Marino et al. | 713/150 |
| 5,596,718 A * | 1/1997 | Boebert et al. | 713/201 |
| 5,680,547 A | 10/1997 | Chang | 395/200.1 |
| 5,802,178 A * | 9/1998 | Holden et al. | 713/151 |
| 5,822,435 A * | 10/1998 | Boebert et al. | 713/192 |
| 6,138,239 A | 10/2000 | Veil | 713/200 |
| 6,330,670 B1 | 12/2001 | England et al. | 713/2 |
| 6,385,724 B1 * | 5/2002 | Beckman et al. | 713/167 |

FOREIGN PATENT DOCUMENTS

| | | |
|---|---|---|
| EP | 0 848 315 A2 | 6/1998 |
| EP | 0 849 657 A1 | 6/1998 |
| WO | 94/01821 | 7/1993 |
| WO | 94/01821 | 1/1994 |
| WO | WO 95/24696 | 9/1995 |
| WO | WO 97/07463 | 2/1997 |
| WO | WO 97/37305 | 10/1997 |
| WO | WO 98/15082 | 4/1998 |
| WO | WO 98/25372 | 6/1998 |
| WO | 98/36517 | 8/1998 |

OTHER PUBLICATIONS

Berger, J.L., et al., "Compartmented Mode Workstation: Prototype Highlights," *IEEE Transactions on Software Engineering*, vol. 16, No. 6, pp. 608-618 (Jun. 1990).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-E (1999).

The Trusted Computing Platform Alliance, "Building a Foundation of Trust in the PC,", 9 pages, located at Internet address <www.trustedpc.org/home/home.html> (Jan. 2000).

Trusted Computing Platform Alliance, Main Specification Version 1.0, 284 pages (Jan. 25, 2001).

Wiseman, S., et al, "The Trusted Path between SMITE and the User," *IEEE Proceedings of the Symposium on Security and Privacy*, pp. 147-155 (1988).

Yee, B., "Using Secure Coprocessors," Doctoral thesis—Carnegie Mellon University, pp. 1-94 (May 1994).

\* cited by examiner

COMMUNICATIONS BETWEEN MODULES OF A COMPUTING APPARATUS

TECHNICAL FIELD

This invention relates to computing apparatuses and is concerned in particular with improving trust and security between various modules of a computing apparatus.

BACKGROUND ART

Concerns over the integrity of computer platforms arise because commercial client platforms are often in environments which are vulnerable to unauthorised modification, either by software loaded by the user or by software loaded via a network connection. Therefore users may be reluctant to trust a platform for manipulation of critical data, and it is desirable to improve the level of security within the computer platform.

Weakness arises from the fact that conventional functional modules (CPU, memory, hard disk drive, keyboard, CDROM, DVD, smartcard reader, ISA card, EISA card, PCI card, etc.) of a computer platform do not validate information communicated between those modules, and communications with a module are not confidential. The main reasons for this weakness are that:

the main 'computing engine' of a computer platform is physically distributed within the platform (separate CPU, memory, long term storage, etc.), and many individual distributed components of that main computing engine do not have the functionality to secure the data they communicate;

communications between both the elements of that distributed engine and with other functional modules are done using shared communication paths (a shared communication infrastructure); and the services of functional modules are potentially shared by several other functional modules.

Hence rogue software on the main distributed computing engine, or on another functional module, can eavesdrop on data, and perform or cause inappropriate manipulation of data.

In any shared environment, secure communications (having authentication, integrity, confidentiality, etc.) are possible if functional modules have their own self-contained computing engines that are capable of cryptographic security functions. Such engines would allow functional modules to authenticate the source of data, verify the integrity of data, and provide confidentiality of data. Many functional modules in a computer platform already have self-contained computing engines, and it would be possible to modify those engines (physically and/or by programming) to provide the necessary cryptographic security functions. Such modifications, per se, will be obvious to those skilled in the art of security and electronics. Even so, a remaining problem is that all such cryptographic processes rely upon the use of secrets, commonly called keys. Keys must be distributed. Each functional module must have its own secrets and access to the appropriate secrets of other functional modules. These properties and difficulties, and the nature and use of keys, are, per se, well known to those skilled in the art of information security.

DISCLOSURE OF THE INVENTION

It is found that a particularly effective element in establishing trusted communication is the use of a trusted component or module in a computer platform to enable verification of the integrity of a computer platform by the reliable measurement and reliable reporting of integrity metrics. A trusted module is essentially immune to unauthorised modification or inspection of internal data. It is physical to prevent forgery, tamper-resistant to prevent counterfeiting, and has crypto functionality to securely communicate at a distance. Methods of building trusted modules, per se, will be apparent to those skilled in the art. The trusted module uses cryptographic methods to give itself a cryptographic identity and to provide authenticity, integrity, confidentiality, guard against replay attacks, make digital signatures, and use digital certificates as required. These and other crypto methods and their initialisation are, per se, well known to those skilled in the art of security. The role of such a trusted component is described in a copending International Patent Application by the same applicant of the same date as the present application and entitled "Trusted Computing Platform".

In accordance with the present invention, there is provided a computing apparatus, comprising a trusted hardware module; a plurality of further hardware modules; a shared communication infrastructure (such as normal EISA and PCI buses) by which the modules can communicate with each other; and a first communication path, distinct from the communication infrastructure, by which a first one of the further modules can communicate directly with the trusted module but cannot communicate directly with any other of the further modules. (It should be noted that the first further module may or may not itself be a trusted module in its own right.) Accordingly, the trusted module and first further module can communicate, without the need for encryption and decryption, and without any possibility of any other part of the apparatus eavesdropping on the communication. The first communication path may be implemented as a single dedicated physical wire that permits serial communications, or multiple wires, or optical connections, or very short distance wireless transmissions on different frequencies, and so on. The invention enables the private, implicitly authenticated, communication of information between the trusted module and the first further module. This enables communication of private information, or information whose reliability is paramount. This includes, for example, data per se, or a command, an indication, a flag, or the checksum of data that is to be communicated over the shared communication infrastructure.

Preferably, the trusted module and the first further module each include a respective computing engine which partakes in the direct communication via the first communication path. (It should be understood that, in this context, the phrase "computing engine" means any device capable of manipulating data, including programmed devices and hardwired devices.) Not all functional blocks require the addition of a separate such computing engine. A hard disk drive, for example, may already incorporate a computing engine for the purposes of controlling the hard disk drive and simply require the addition of extra instructions to provide control of the additional communication path. On the other hand, a normal PC's CPU (such as Intel's Pentium processor) is obviously a computing engine, but has no obvious separate computing engine. It may therefore be provided with an additional computing engine, or some other method to allow the CPU's general purpose computing engine to be used as the 'separate' computing engine. For example, an existing CPU can be modified to include a new instruction and new hardware that communicates data over the protected communication path.

The first further module is preferably operable to supply to the trusted module a request for operation on data, and, in response to such a request, the trusted module is operable to generate a response and to supply the response to the first further module via the first communication path and not via the shared communication infrastructure. In this case, the trusted module preferably includes means for storing policy information regarding such operations which can and/or cannot be permitted, and is operable to generate the response with reference to the policy information. This improves the level of trust in services provided by one module to another. In particular, note that the first further module can take advantage of the trusted module. The trusted module can, for example, act as a crypto-coprocessor or 'hardware' crypto API, but also contain other non-crypto functions whose trustworthiness is vital, such as computer programs described in other patent applications. The first further module can send data and a request to the trusted module using the shared communication infrastructure. The trusted module can act on the request using the supplied data and report the result back to the first further module over the first communication path. This allows a network interface card, for example, to verify the origin and integrity of external messages without having to securely store (and hide) the necessary keys. Alternatively, the request may be to execute certain secret or protected functions (held within the trusted module) on the supplied data. In all cases, the fact that the response is received using the first communication path indicates to the first further module that the proper trusted module actually received the request, and the response received on the first communication path is actually the judgement of the proper trusted module.

The trusted module is preferably operable to generate an encryption and/or decryption key and to supply that key to the first further module via the first communication path and not via the shared communication infrastructure. In this case, the first further module preferably is operable to use the key for encryption and/or decryption of data communicated via the shared communication infrastructure. Accordingly, the key is kept secret as between the trusted module and the first further module, without the possibility of any other part of the apparatus eavesdropping on the communication of the key. The computing engines in the trusted module and the first further module can exchange keys in plain text along the first communication path. If it is even unacceptable for keys to appear in clear on the first communication path, the trusted module and the first further module can use the Diffie-Hellman protocol to set-up keys therebetween. In the Diffie-Hellman case, the use of the first communication path simply provides implicit proof of identity of the 'other' entity engaging in the Diffie-Hellman process. The apparatus can also used for maintenance and replacement of keys. Such key distribution methods, per se, are well known to those skilled in the art of information security. Once keys have been exchanged, those keys can be used to provide security for communications using the shared communication infrastructure. Such secure communication methods, per se, are well known to those skilled in the art of information security. Note that the generation/distribution of keys is useful even when all of the further modules are also trusted modules.

The trusted module is preferably operable to generate a challenge and to supply the challenge to the first further module via the first communication path or via the shared communication infrastructure using encryption set up using the first communication path. In this case, in response to the challenge, the first further module is preferably operable to generate a response and to supply the response to the trusted module via the first communication path or via the shared communication infrastructure using encryption set up using the first communication path; and the trusted module is operable to use the response in generating an integrity metric of the apparatus. This enables hardware 'watchdog' functionality, where the trusted module can at intervals challenge the first further module over the first communication path or using secure communications set-up using the first communication path. The first further module responds to the challenge with a reply using the first communication path (or secure communications over some other path set up using the first communication path). Such watchdog challenges may be done as a result of receiving an integrity challenge as described in the prior patent application mentioned above.

In one example of the first further module, particularly applicable when it is a network interface module, the first further module preferably has a zone for private data and a zone for non-private data; and the first further module is operable to supply and/or receive data from/for the private data zone via the first communication path and not via the shared communication infrastructure. In this case, the first further module is preferably operable to supply and/or receive data from/for the non-private data zone via the shared communication infrastructure. Also, the first further module preferably has an interface between the private and non-private data zones which is operable to inhibit the passing of unnecessary data from the private data zone to the non-private data zone. Accordingly, the apparatus can be neatly partitioned into safe and unsafe, or non-private and private, data zones.

The apparatus may, of course, include a second communication path, distinct from the communication infrastructure and the first communication path, by which a second one of the further modules (such as a main processor unit of the apparatus or a non-volatile data storage module) can communicate directly with the trusted module. In this case, the second further module preferably cannot communicate directly via the second communication path with any other of the further modules.

In this case, the first further module is preferably operable to supply to the trusted module a request for a transfer of data between the first and second further modules; and, in response to such a request, the trusted module is operable to generate a response and to supply the response to the first or second further module via the first or second communication path, as the case may be, and not via the shared communication infrastructure. In this case, the trusted module preferably includes means for storing policy information regarding such transfers which can and/or cannot be permitted, and is operable to generate the response with reference to the policy information. Also, in response to an appropriate such transfer response, the first or second further module is preferably operable to supply the data to the trusted module via the first or second communication path, as the case may be, and, in response to the receipt of such data, the trusted module is operable to relay the data to the second or first further module, as the case may be, via the second or first communication path, as the case may be.

The apparatus may, of course, include at least a third communication link, distinct from the communication infrastructure and the other communication links, by which at least a third one of the further modules can communicate directly with the trusted module. In this case, the third further module preferably cannot communicate directly via the third communication path with any other of the further modules.

Accordingly, the trusted module can have a switching capability, and the individual communication paths can be used as a 'star' communications network, enabling communications between the further modules under the control of the trusted module. The trusted module can route or block information between further modules according to some policy stored in the trusted module. In particular, since the communication network is a star, the trusted module can present information to the concerned modules only, thus denying other modules the opportunity to eavesdrop.

BRIEF DESCRIPTION OF THE DRAWINGS

A specific embodiment of the present invention will now be described, purely by way of example, with reference to the accompanying drawings, in which.

BEST MODE OF CARRYING OUT THE INVENTION

Before describing the embodiment of the present invention, the computing platform incorporating a trusted device which is the subject of the copending patent application mentioned above will firstly be described with reference to FIGS. 1 to 6.

In this example of a trusted platform, there is provided the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

Figure 1:
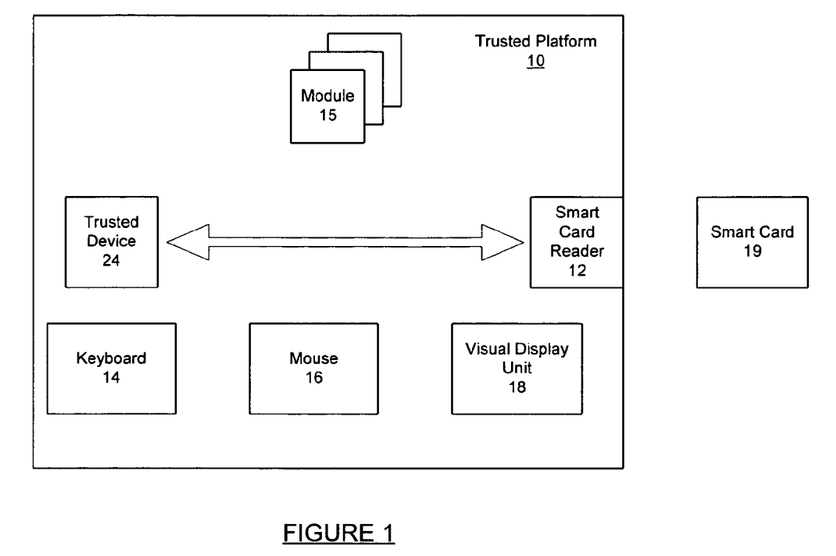
FIG. 1 is a diagram that illustrates a system capable of implementing embodiments of the present invention.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
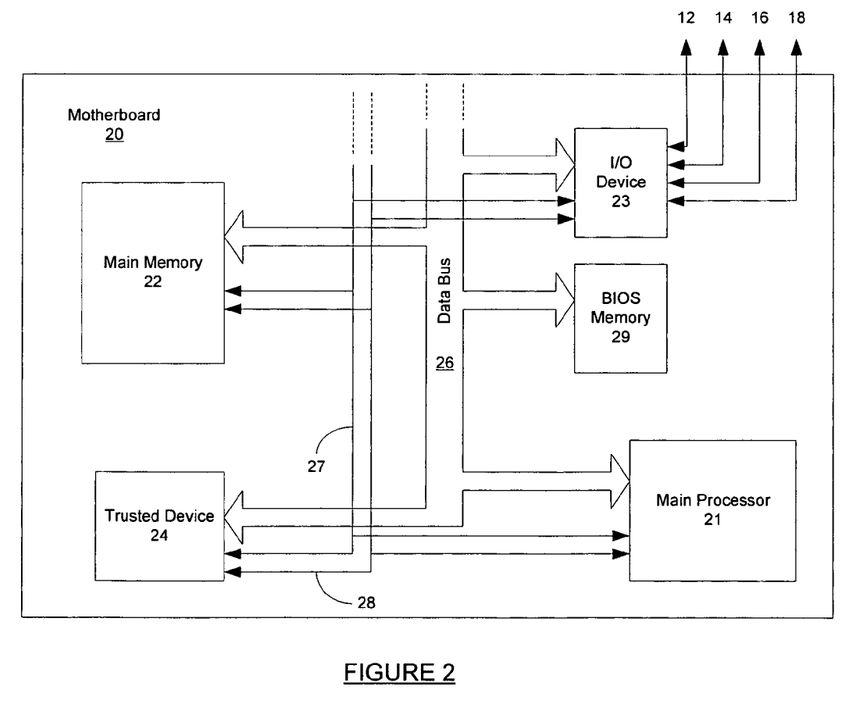
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses F000h to FFFFh), and the main processor is arranged to look at this memory location first, in accordance with an industry wide standard The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
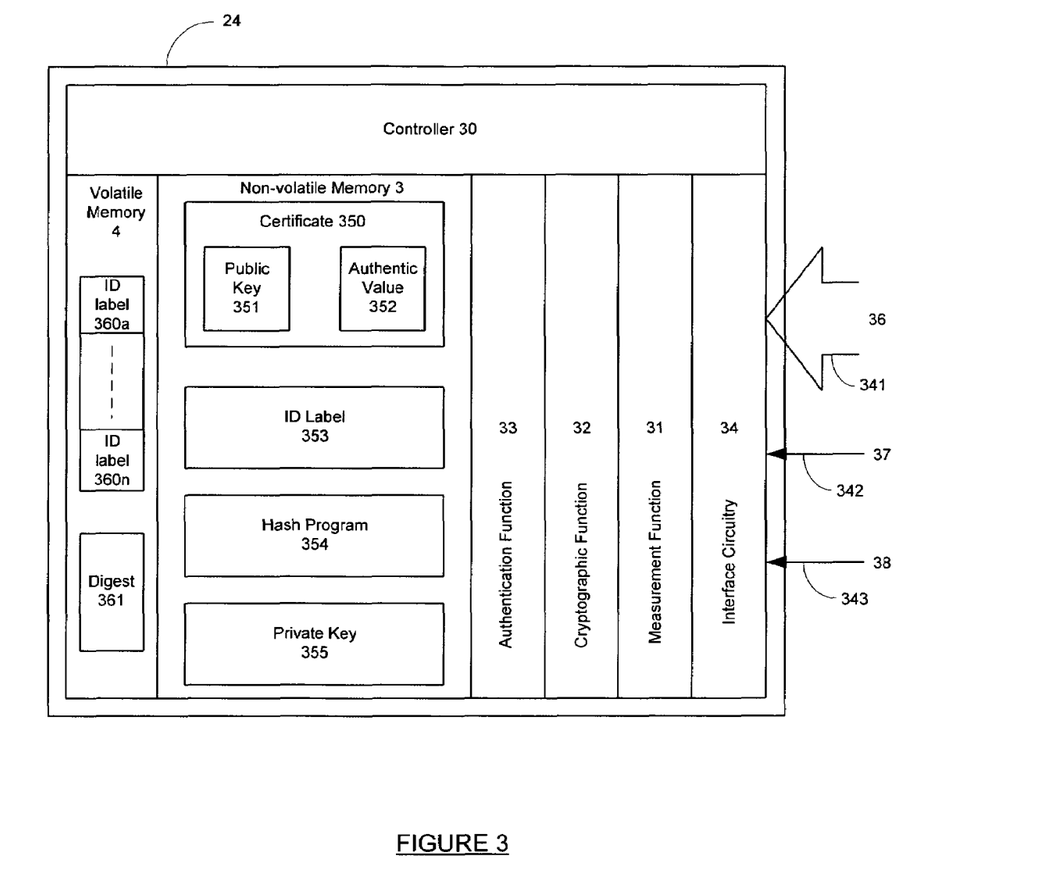
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a–360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
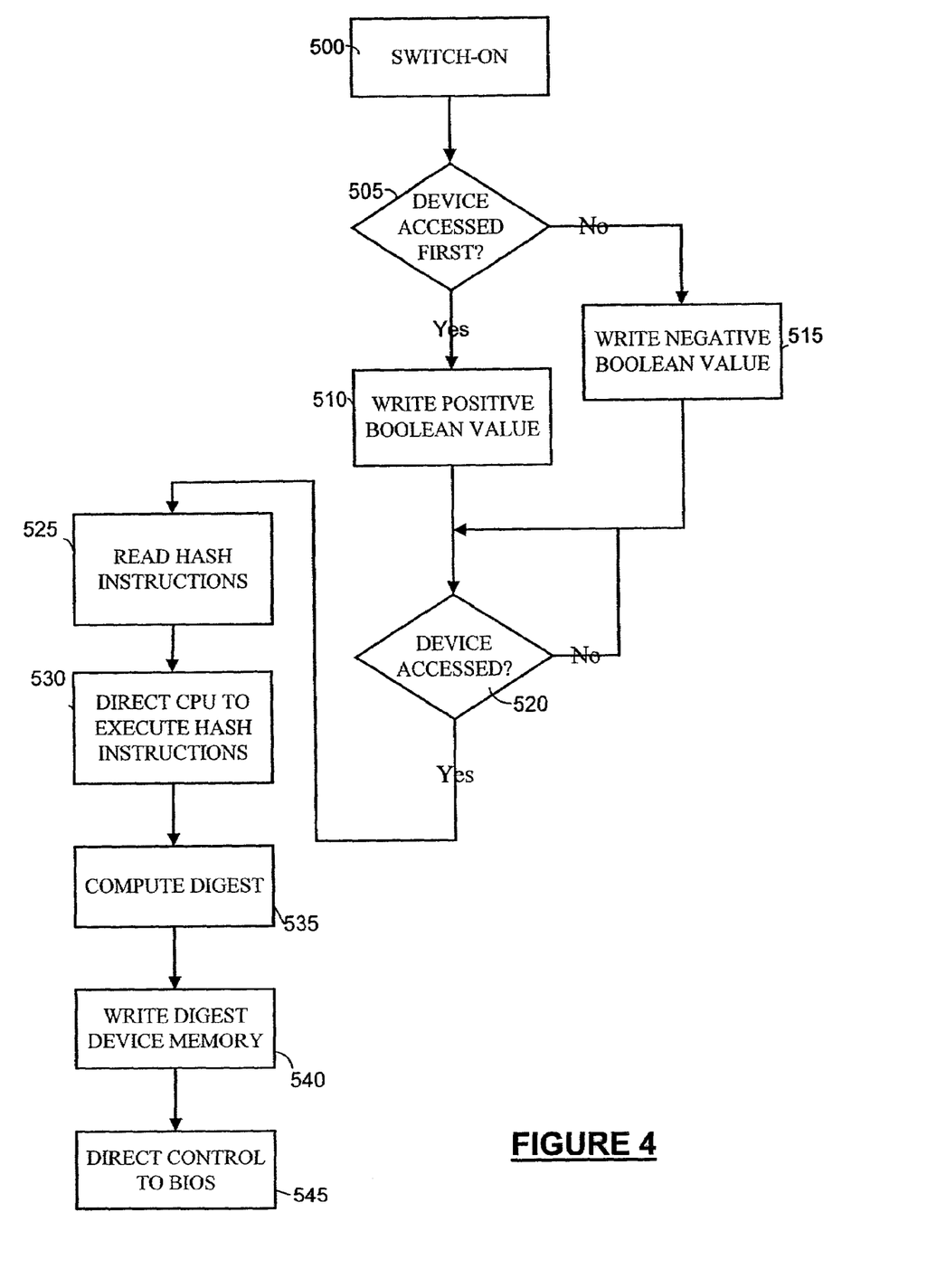
FIG. 4 is a flow diagram which illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths—this is the subject of the present application and is discussed further below with reference to FIGS. 7 to 13. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
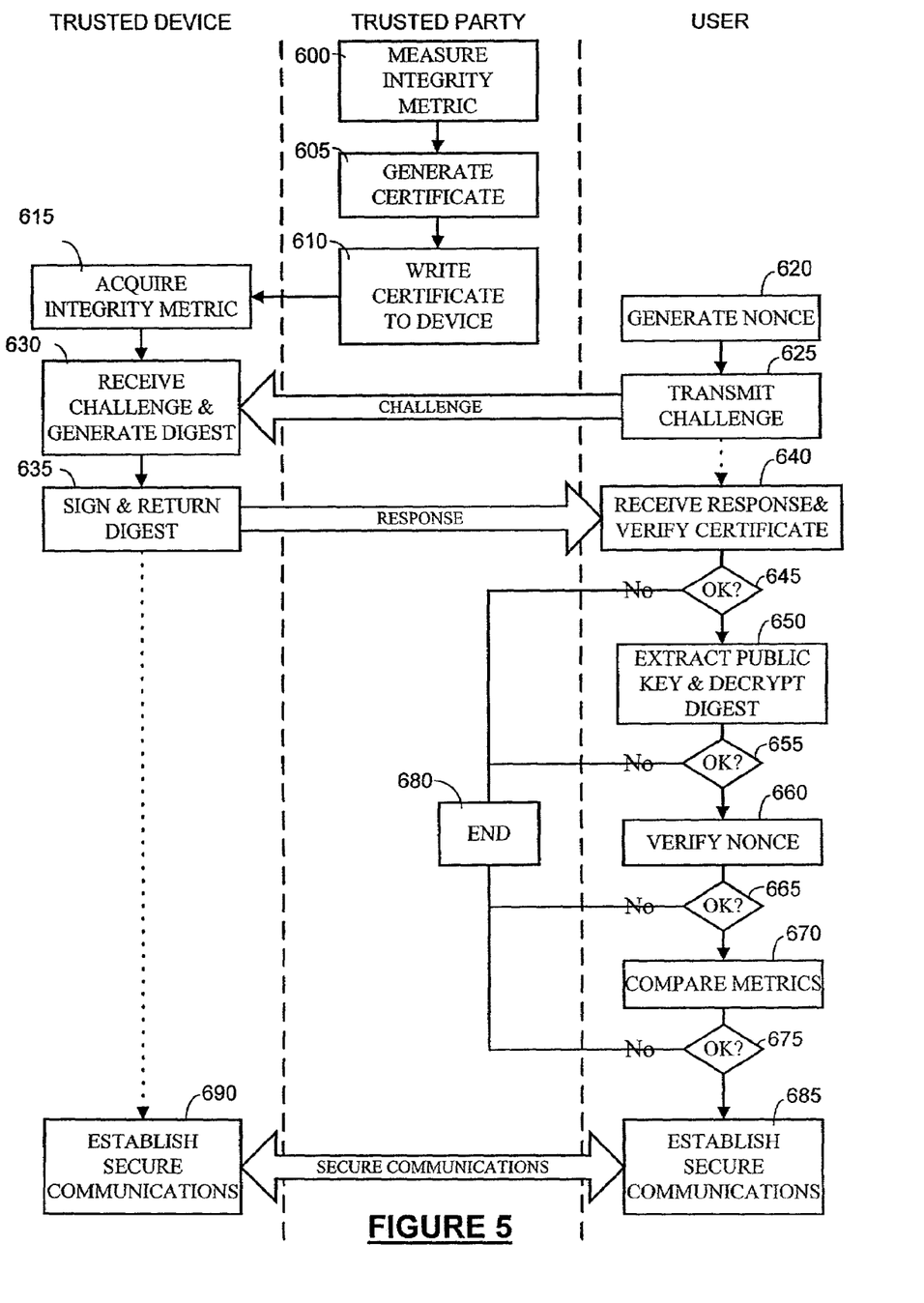
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
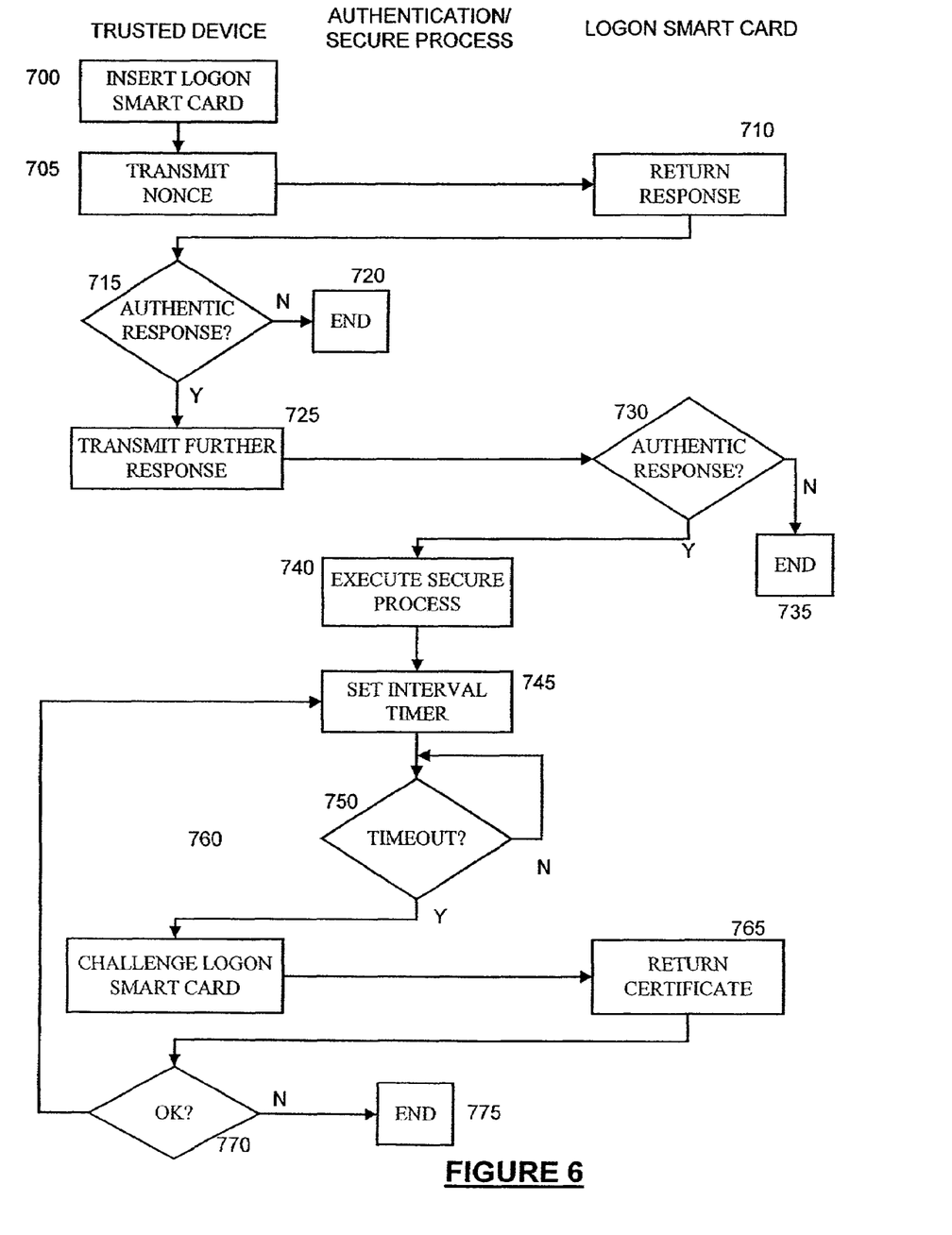
FIG. 6 is a flow diagram which illustrates the steps involved in verification of a trusted computing platform by a potential user of that platform by means of a smart card.

As indicated above, FIG. 6 shows the flow of actions in an example of verification of platform integrity by a user interacting with the trusted platform with a smart card 19. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 1993. Of course, there is no reason why other authentication procedures cannot be used, for example 2-step or 4-step, as also described in this reference.

Initially, the user inserts their smart card 19 into the smart card reader 12 of the platform in step 700.

Beforehand, a platform configured for use by users of in this way will typically be operating under the control of its standard operating system and executing the authentication process, which waits for a user to insert their smart card 19. Apart from the smart card reader 12 being active in this way, such a platform is typically rendered inaccessible to users by 'locking' the user interface (i.e. the screen, keyboard and mouse). This will however not be the case in all embodiments of the invention.

When the smart card 19 is inserted into the smart card reader 12, the trusted device 24 is triggered to attempt mutual authentication in step by generating and transmitting a nonce A to the smart card 19 in step 705. A nonce, such as a random number, is used to protect the originator from deception caused by replay of old but genuine responses (called a 'replay attack') by untrustworthy third parties.

In response, in step 710, the smart card 19 generates and returns a response comprising the concatenation of: the plain text of the nonce A, a new nonce B generated by the smart card 19, an ID of the trusted device 24 and some redundancy; the signature of the plain text, generated by signing the plain text with the private key of the smart card 19; and a certificate containing the ID and the public key of the smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, an ID of the smart card 19 and the acquired integrity metric; the signature of the plain text, generated by signing the plain text using the private key of the trusted device 24; and the certificate comprising the public key of the trusted device 24 and the authentic integrity metric, both signed by the private key of the TP.

The smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the logon card 19 and the smart card 19 has verified the integrity of the trusted platform and, in step 740, the authentication process executes the secure process for the user.

In certain types of interaction, the authentication process can end at this point. However, if a session is to be continued between the user and the trusted platform, it is desirable to ensure that the user remains authenticated to the platform.

Where continued authentication is required, the authentication process sets an interval timer in step 745. Thereafter, using appropriate operating system interrupt routines, the authentication process services the interval timer periodically to detect when the timer meets or exceeds a predetermined timeout period in step 750.

Clearly, the authentication process and the interval timer run in parallel with the secure process. When the timeout period is met or exceeded, the authentication process triggers the trusted device 24 to re-authenticate the smart card 19, by transmitting a challenge for the smart card 19 to identify itself in step 760. The smart card 19 returns a certificate including its ID and its public key in step 765. In step 770, if there is no response (for example, as a result of the smart card 19 having been removed) or the certificate is no longer valid for some reason (for example, the smart card has been replaced with a different smart card), the session is terminated by the trusted device 24 in step 775. Otherwise, in step 770, the process from step 745 repeats by resetting the interval timer.

Additionally, or alternatively, in some embodiments it may be required that the user profile is encrypted and signed to protect privacy and integrity. If so, a secure data transfer protocol may be needed between the trusted device 24 and the smart card 19. There exist many available mechanisms for transferring secure credentials between two entities. A possible implementation, which may be used in the present embodiment, is secure key transport mechanisms from ISO/IEC DIS 11770-3, "Information technology—Security techniques—Key management—Part 3: Mechanisms using asymmetric techniques", International Organization for Standardization, March 1997.

Modifications of this verification process using other well-known challenge and response techniques can easily be achieved by the skilled person. Similarly, alternative verification processes can be used by parties interacting with the platform in a different manner (that is, other than as a user equipped with a smart card).

Figure 7:
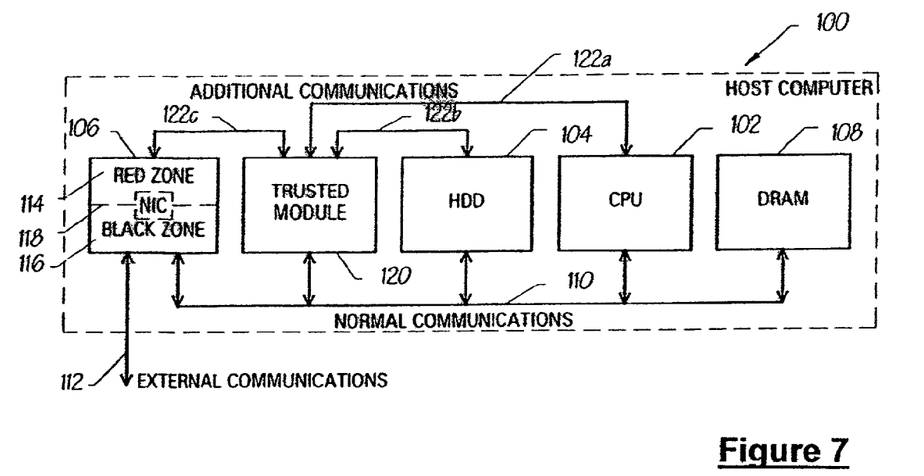
FIG. 7 is a schematic block diagram of a host computer system embodying the invention.

Referring now to FIG. 7, a specific embodiment of the present invention will be described. In FIG. 7, a host computer 100 has a main CPU 102, a hard disk drive 104, a PCI network interface card 106 and DRAM memory 108 with conventional ("normal") communications paths 110 (such as ISA, EISA, PCI, USB) therebetween. The network interface card 106 also has an external communication path 112 with the world outside the host computer 100.

The network interface card 106 is logically divided into "red" and "black" data zones 114,116 with an interface 118 therebetween. In the red zone 114, data is usually plain text and is sensitive and vulnerable to undetectable alteration and undesired eavesdropping. In the black data zone 116, data is protected from undetected alteration and undesired eavesdropping (preferably encrypted by standard crypto mechanisms). The interface 118 ensures that red information does not leak into the black zone 116. The interface 118 preferably uses standard crypto methods and electronic isolation techniques to separate the red and black zones 114,116. The design and construction of such red and black zones 114,116 and the interface 118 is well known to those skilled in the art of security and electronics, particularly in the military field. The normal communication path 110 and external communication path 112 connect with the black zone 116 of the network interface card 106.

The host computer 100 also includes a trusted module 120 which is connected, not only to the normal communication paths 110, but also by mutually separate additional communication paths 122 (sub-referenced 122a,122b,122c) to the CPU 102, hard disk drive 104 and the red zone 114 of the network interface card 106. By way of example, the trusted module 120 does not have such a separate additional communication path 122 with the memory 108.

The trusted module 120 can communicate with the CPU 102, hard disk drive 104 and red zone 114 of the network interface card 106 via the additional communication paths 122a,b,c, respectively. It can also communicate with the CPU 102, hard disk drive 104, black zone 116 of the network interface card 106 and the memory 108 via the normal communication paths 110. The trusted module 120 can also act as a 100VG switching centre to route certain information between the CPU 102, hard disk drive 104 and the red zone 114 of the network interface card 106, via the trusted module 120 and the additional communication paths 122, under control of a policy stored in the trusted module. The trusted module 120 can also generate cryptographic keys and distribute those keys to the CPU 102, the hard disk drive 104, and the red zone 114 of the network interface card 106 via the additional communication paths 122a,b,c, respectively.

Figure 8:
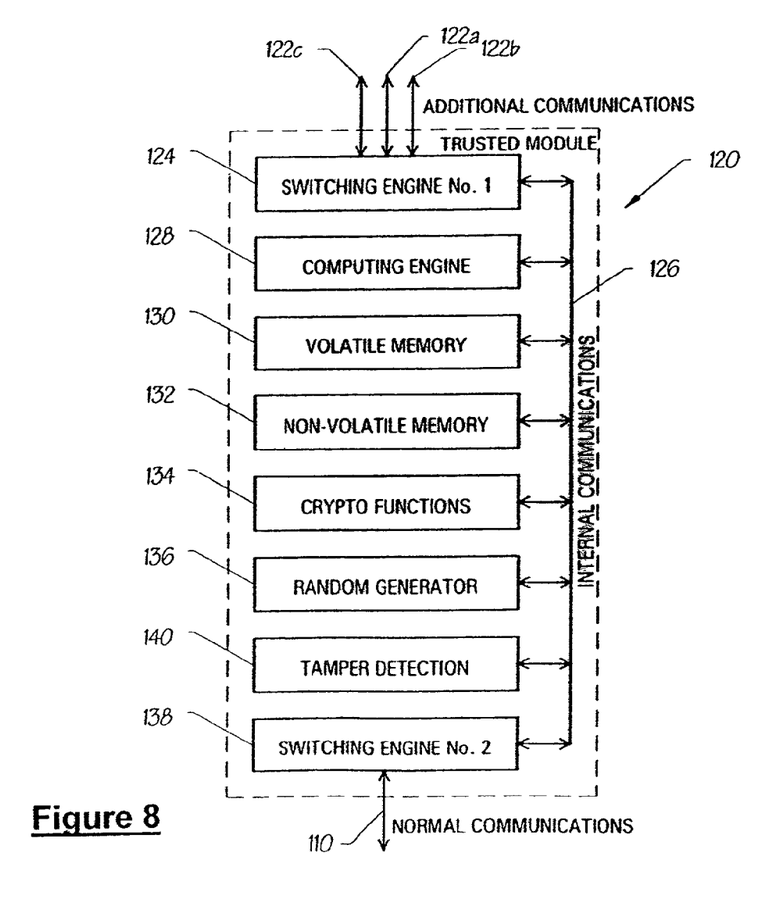
FIG. 8 is a schematic block diagram of a trusted module in the system of FIG. 7.

FIG. 8 illustrates the physical architecture of the trusted module 120. A first switching engine 124 is connected separately to the additional communication paths 122a,b,c and also to an internal communication path 126 of the trusted module 120. This switching engine 124 is under control of a policy loaded into the trusted module 120. Other components of the trusted module 120 are:

- a computing engine 128 that manages the trusted module 120 and performs general purpose computing for the trusted module 120;
- volatile memory 130 that stores temporary data;
- non-volatile memory 132 that stores long term data;
- cryptographic engines 134 that perform specialist crypto functions such as encryption and key generation;
- a random number source 136 used primarily in crypto operations;

a second switching engine 138 that connects the trusted module 120 to the normal communication paths 110; and tamper detection mechanisms 140, all connected to the internal communication path 126 of the trusted module 120. The trusted module 120 is based on a trusted device or module 14 as described in more detail above with reference to FIGS. 1 to 6.

With regard to crypto key generation and distribution, the trusted module 120 generates cryptographic keys, using the random number generator 136, a hash algorithm, and other algorithms, all of which are well known, per se, to those skilled in the art of security. The trusted module 120 distributes selected keys to the CPU 102, hard disk drive 104 and the red zone 114 of the network interface card 106 using the additional communication paths 122a,b,c, respectively, rather than the normal communications paths 110. Keys may be used for communications between the internal modules 102,104,106,120 of the platform over the normal communication paths 110. Other temporary keys may be used (by the network interface card 106 or CPU 102) for bulk encryption or decryption of external data using the SSL protocol after the trusted module 120 has completed the SSL handshaking phase that uses long term identity secrets that must not be revealed outside the trusted module 120. Other temporary keys may be used (by the hard disk drive 104 or CPU 102) for bulk encryption or decryption of data stored on the hard disk drive 104 after those temporary keys have been created or revealed inside the trusted module 120 using long term secrets that must not be revealed outside the trusted module 120.

The trusted module 120 enforces policy control over communications between modules by the selective distribution of encryption keys. The trusted module 120 enforces a policy ban on communications between given pairs of modules by refusing to issue keys that enable secure communications over the shared infrastructure 110 between those pairs of modules.

Figure 9:
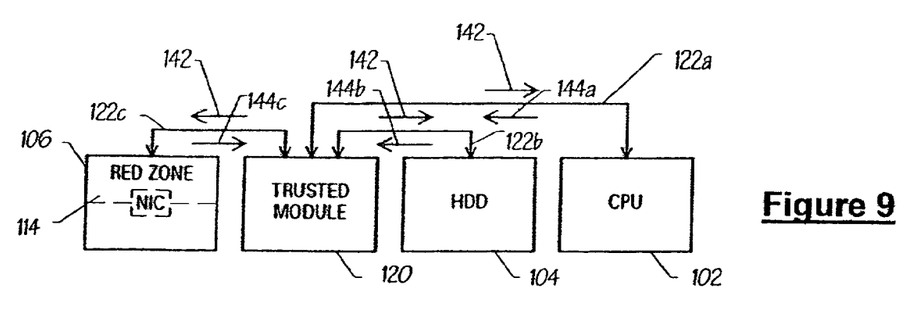
FIGS. 9 to 12 show parts of the system of FIG. 7 to illustrate various communication methods employed therein.

FIG. 9 illustrates a process by which the trusted module 120 can perform a watchdog function and 'ping' the modules 102,104,106 connected to the additional communication paths 122. The trusted module generates a challenge 142 and sends it to the CPU 102, hard disk drive 104 and red zone 114 of the network interface card 106 using the additional communication paths 122a,b,c, respectively. Each of the CPU 102, hard disk drive 104 and network interface card 106 responds with a response 144a,b,c, respectively, on the respective additional communication path 122a,b,c to say whether the respective module is active, and preferably that the module is acting properly. The trusted module 120 notes the responses 144a,b,c and uses them as metrics in its responses to integrity challenges that are described above with reference to FIGS. 1 to 6.

Figure 10:
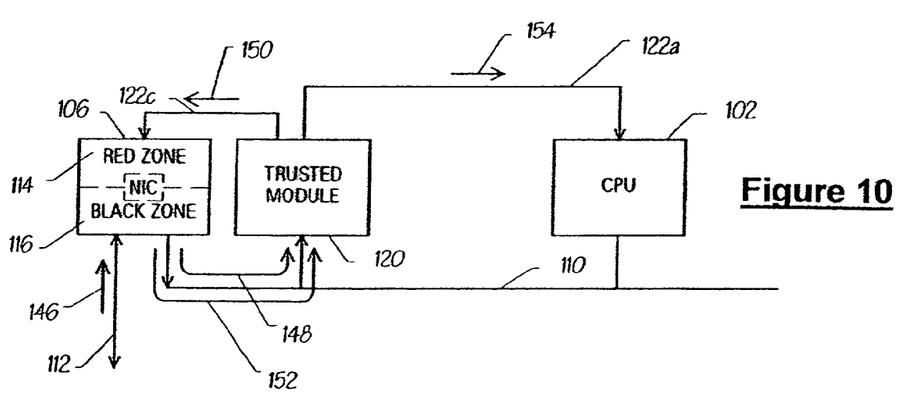

FIG. 10 illustrates the process by which incoming external secure messages are processed when the trusted module 120 is the only module in the platform with cryptographic capabilities. An external message 146 is received by the black zone 116 of the network interface card 106 using the external communication path 112. The network interface card 106 sends a protocol data unit 148 (to be described in further detail later) containing some data and a request for an authentication and integrity check to the trusted module 120 using the normal communication paths 110. The trusted module 120 performs the authentication and integrity checks using the long term keys inside the trusted module 120 that must not revealed outside the trusted module 120, and sends a protocol data unit 150 containing an 'OK' indication to the red zone 114 of the network interface card 106 using the additional communication path 122c. The network interface card 106 then sends a protocol data unit 152 containing some data and a request for decryption to the trusted module 120 using the normal communication paths 110. The trusted module 120 decrypts the data using either temporary or long term keys inside the trusted module 120, and sends a protocol data unit 154 containing the decrypted data to the CPU 102 using the additional communication path 122a. The CPU then takes appropriate action.

Figure 11:
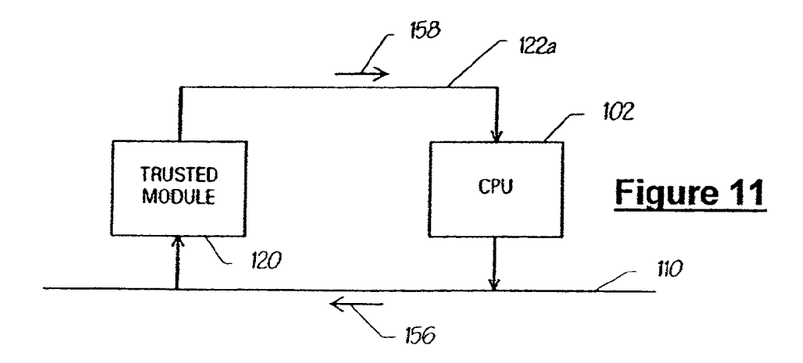

FIG. 11 illustrates the process by which the CPU 102 requests a policy decision from the trusted module 120. This could be used, for example, when the CPU 102 must determine whether policy allows certain data to be manipulated or an application to be executed. This is described in more detail in another patent application having the same date of filing as the present application. The CPU 102 sends a protocol data unit 156 containing a request to the trusted module 120 using the normal communication paths 110. The trusted module 120 processes the request 156 according to the policy stored inside the trusted module 120. The trusted module 120 sends a protocol data unit 158 containing a reply to the CPU 102 using the additional communication path 122a, in order that the CPU 102 can be sure that authorisation came from the trusted module 120. If the action is authorised, the CPU 102 takes the necessary action. Otherwise, it abandons the process.

Figure 12:
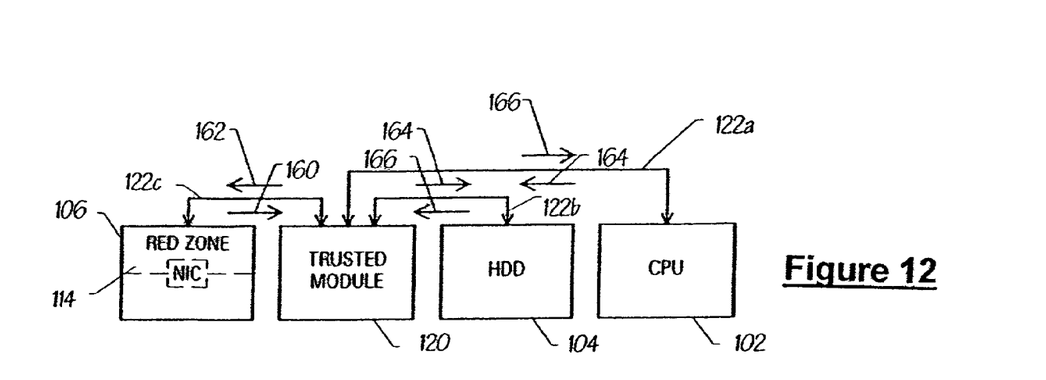

FIG. 12 illustrates an example of the control of policy over protected communications between the modules 102, 104,106. All of the communications in this example use the additional communication paths 122. The red zone 114 of the network interface card 106 sends a protocol data unit 160 that is destined for the hard disk drive 104 to the trusted module 120 on the additional data path 122c. In the case where the policy does not permit this, the trusted module 120 denies the request by sending a protocol data unit 162 containing a denial to the network interface card 106 on the additional data path 122c. Later, the CPU 102 requests sensitive data from the hard disk drive 104 by sending a protocol data unit 164 addressed to the hard disk drive, but sent on the additional data path 122a to the trusted module 120. The trusted module 120 checks that the policy allows this. In the case where it does, the trusted module 120 relays the protocol data unit 164 to the hard disk drive 104 on the additional data path 122b. The hard disk drive 104 provides the data and sends it in a protocol data unit 166 on the additional data path 122b back to the trusted module 120 addressed to the CPU 102. The trusted module 120 checks that the policy allows this, and, in the case where it does, relays the protocol data unit 166 to the CPU 102 on the additional data path 122a.

Figure 13:
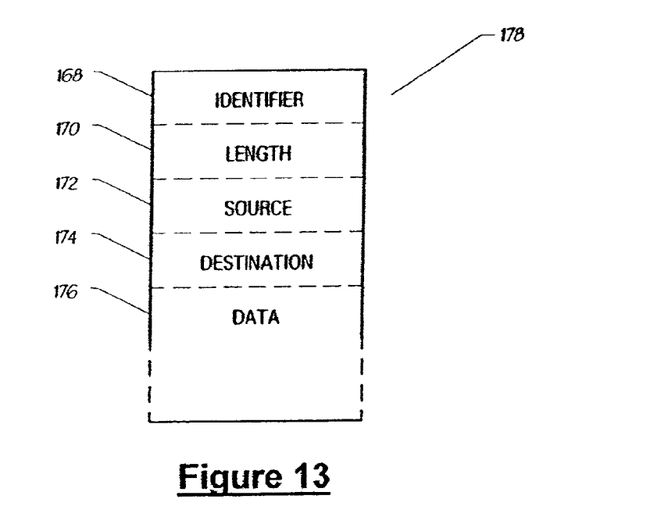
FIG. 13 illustrates the format of a protocol data unit used in the system of FIG. 7.

FIG. 13 illustrates the format of the data protocol units 178 by which data is passed over the additional communication paths 122. The data protocol unit 178 has:— an identifier field 168 indicating the type of the protocol data unit;

a length field 170 indicating the length of the protocol data unit;

a source field 172 indicating the source of the protocol data unit;

a destination field 174 indicating the destination of the protocol data unit;

and so on, including in many cases a data field 176.

Not all fields are always necessary. For example, assuming the policy of the trusted module 120 forbids it to relay key protocol data units that that did not originate within the trusted module 120, the CPU 102, hard disk drive 104 and network interface card 106 can therefore assume that keys are always from the trusted module 120. Hence, source and destination fields are unnecessary in key protocol data units—such protocol data units are implicitly authenticated. The design and construction and use, per se, of protocol data units is well known to those skilled in the art of communications.

It should be noted that the embodiment of the invention has been described above purely by way of example and that many modifications and developments may be made thereto within the scope of the present invention.

The invention claimed is:

1. A computing apparatus comprising:
 a trusted hardware module;
 a plurality of further hardware modules;
 a shared communication infrastructure by which the hardware modules can communicate with each other; and
 a first communication path, distinct from the shared communication infrastructure, by which a first one of the further hardware modules can communicate directly with the trusted hardware module but cannot communicate directly with any other of the further hardware modules.

2. An apparatus as claimed in claim 1, wherein the trusted hardware module and the first further hardware module each include a respective computing engine which partakes in the direct communication via the first communication path.

3. An apparatus as claimed in claim 2, wherein:
 the first further hardware module is operable to supply to the trusted hardware module a request for operation on data; and
 in response to such a request, the trusted hardware module is operable to generate a response and to supply the response to the first further hardware module via the first communication path and not via the shared communication infrastructure.

4. An apparatus as claimed in claim 3, wherein the trusted hardware module includes means for storing policy information regarding such operations which can or cannot be permitted, and is operable to generate the response with reference to the policy information.

5. An apparatus as claimed in claim 1, wherein the trusted hardware module is operable to generate an encryption and/or decryption key and to supply that key to the first further hardware module via the first communication path and not via the shared communication infrastructure.

6. An apparatus as claimed in claim 5, wherein the first further hardware module is operable to use the key for encryption and/or decryption of data communicated via the shared communication infrastructure.

7. An apparatus as claimed in claim 1, wherein the trusted hardware module is operable to generate a challenge and to supply the challenge to the first further hardware module via the first communication path or via the shared communication infrastructure using encryption set up using the first communication path.

8. An apparatus as claimed in claim 7, wherein:
 in response to the challenge, the first further hardware module is operable to generate a response and to supply the response to the trusted hardware module via the first communication path or via the shared communication infrastructure using encryption set up using the first communication path; and
 the trusted hardware module is operable to use the response in generating an integrity metric of the apparatus.

9. An apparatus as claimed in claim 1, wherein:
 the first further hardware module has a zone for private data and a zone for non-private data; and
 the first further hardware module is operable to supply and/or receive data from/for the private data zone via the first communication path and not via the shared communication infrastructure.

10. An apparatus as claimed in claim 9, wherein the first further hardware module is operable to supply and/or receive data from/for the non-private data zone via the shared communication infrastructure.

11. An apparatus as claimed in claim 10, wherein the first further hardware module has an interface between the private and non-private data zones which is operable to inhibit the passing of data from the private data zone to the non-private data zone.

12. An apparatus as claimed in claim 1, wherein the first further hardware module is a network interface module.

13. An apparatus as claimed in claim 1, and including a second communication path, distinct from the shared communication infrastructure and the first communication path, by which a second one of the further hardware modules can communicate directly with the trusted hardware module but cannot communicate directly with any other of the further hardware modules.

14. An apparatus as claimed in claim 13, wherein:
 the first further hardware module is operable to supply to the trusted hardware module a request for a transfer of data between the first and second further hardware modules; and
 in response to such a request, the trusted hardware module is operable to generate a response and to supply the response to the first or second further hardware module via the first or second communication path, respectively, and not via the shared communication infrastructure.

15. An apparatus as claimed in claim 14, wherein the trusted hardware module includes means for storing policy information regarding such transfers which can or cannot be permitted, and is operable to generate the response with reference to the policy information.

16. An apparatus as claimed in claim 14, wherein:
 in response to an appropriate such transfer response, the first or second further hardware module is operable to supply the data to the trusted hardware module via the first or second communication path, respectively; and
 in response to the receipt of such data, the trusted hardware module is operable to relay the data to the second or first further hardware module, respectively, via the second or first communication path, as the case may be.

17. An apparatus as claimed in claim 13, wherein the second further hardware module is a main processor unit of the apparatus or a non-volatile data storage module.

18. An apparatus as claimed in claim 13, and including at least a third communication path, distinct from the shared communication infrastructure and the other communication paths, by which at least a third one of the further hardware modules can communicate directly with the trusted hardware module but cannot communicate directly with any other of the further hardware modules.

19. An apparatus as claimed in claim 18, wherein the second further hardware module is a main processor unit of the apparatus and the third further hardware module is a non-volatile data storage module.

20. An apparatus as claimed in claim 1, wherein the trusted hardware module is adapted to measure an integrity metric of the computing apparatus.

21. A computing apparatus comprising:
- a trusted hardware module resistant to unauthorized modification;
- a plurality of further hardware modules;
- a shared communication infrastructure by which the hardware modules can communicate with each other; and
- a first communication path distinct from the shared communication infrastructure by which a first one of the further hardware modules can communicate directly with the trusted hardware module but which is inaccessible to the other further hardware modules.

22. An apparatus as claimed in claim 21, wherein the trusted hardware module and the first further hardware module each include a respective computing engine which partakes in the direct communication via the first communication path.

23. An apparatus as claimed in claim 22, wherein:
- the first further hardware module is operable to supply to the trusted hardware module a request for operation on data; and
- in response to such a request, the trusted hardware module is operable to generate a response and to supply the response to the first further hardware module via the first communication path and not via the shared communication infrastructure.

24. An apparatus as claimed in claim 23, wherein the trusted hardware module includes means for storing policy information regarding such operations which can or cannot be permitted, and is operable to generate the response with reference to the policy information.

25. An apparatus as claimed in claim 21, wherein the trusted hardware module is operable to generate an encryption and/or decryption key and to supply that key to the first further hardware module via the first communication path and not via the shared communication infrastructure.

26. An apparatus as claimed in claim 25, wherein the first further hardware module is operable to use the key for encryption and/or decryption of data communicated via the shared communication infrastructure.

27. An apparatus as claimed in claim 21, wherein the trusted hardware module is operable to generate a challenge and to supply the challenge to the first further hardware module via the first communication path or via the shared communication infrastructure using encryption set up using the first communication path.

28. An apparatus as claimed in claim 27, wherein:
- in response to the challenge, the first further hardware module is operable to generate a response and to supply the response to the trusted hardware module via the first communication path or via the shared communication infrastructure using encryption set up using the first communication path; and
- the trusted hardware module is operable to use the response in generating an integrity metric of the apparatus.

29. An apparatus as claimed in claim 21, wherein the first further hardware module is a network interface module.

30. An apparatus as claimed in claim 21, wherein the trusted hardware module is adapted to measure an integrity metric of the computing apparatus.

* * * * *